Feb. 5, 1963   E. LANG   3,076,405
COOKING UTENSIL
Filed Jan. 29, 1958
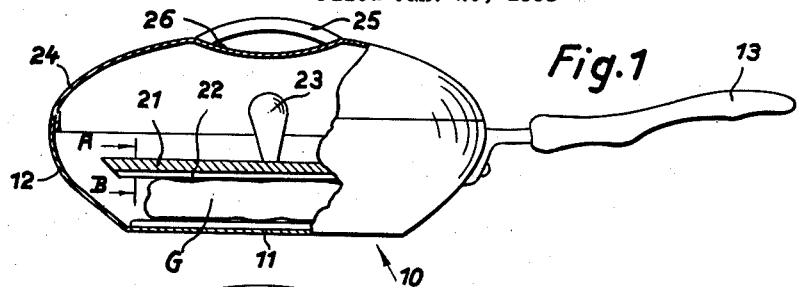
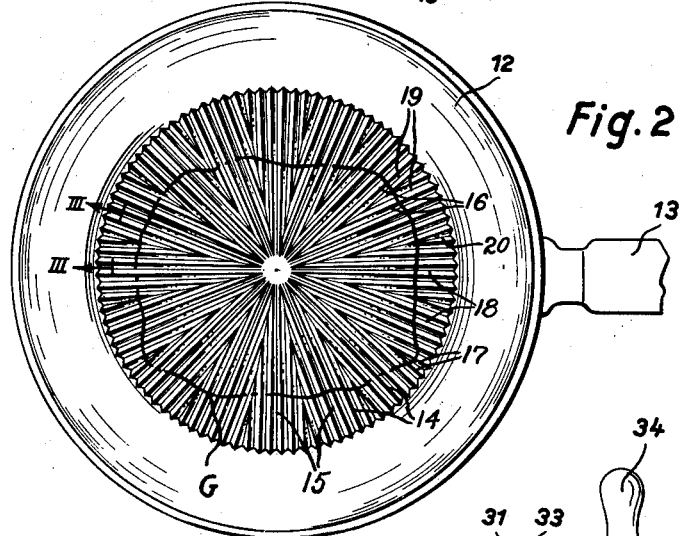
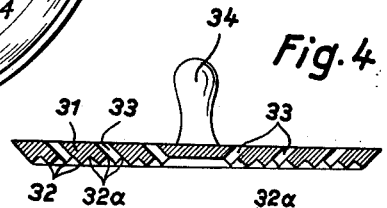
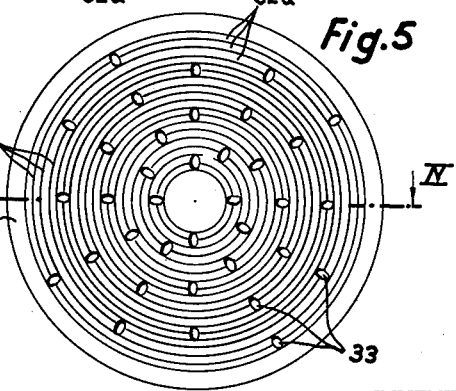
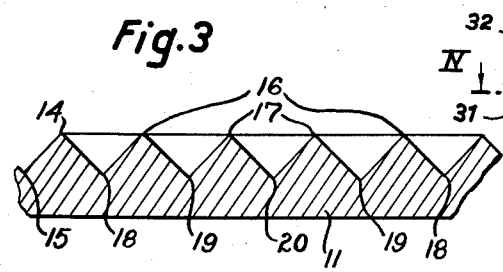
INVENTOR
Ernst Lang
BY Michael S. Striker
ATTORNEY //..
United States Patent Office 3,076,405
Patented Feb. 5, 1963

3,076,405
COOKING UTENSIL
Ernst Lang, Nagold, Germany, assignor to Heinrich Ritter, Esslingen (Neckar), Germany
Filed Jan. 29, 1958, Ser. No. 711,891
3 Claims. (Cl. 99—445)

The present invention refers to cooking utensils, particularly of that type which is suitable for grilling meat or the like.

It is a main object of this invention to provide for a cooking utensil of the type set forth which would more efficiently work by facilitating the access of hot air to the meat or the like which is being handled in the device.

It is another object of the invention to provide for a utensil as set forth in which the posssibility of burning of the food to be grilled is prevented.

With the above objects in mind, the cooking utensil according to the invention mainly comprises a pan member including a bottom plate having a top surface adapted to support the food to be grilled, and formed with a plurality of grooves extending in substantially radial direction with open outer ends and alternating with ribs between neighboring grooves so that radial strip areas of said mass can be supported by said ribs, while the areas in-between are exposed to the air in said grooves, thus permitting free circulation of air between the outside and said exposed areas of the food item.

In another aspect of the invention, the cooking utensil comprises the combination set forth in the preceding paragraph and includes a weighting plate adapted to be placed on top of said food for causing the latter to be enclosed between the bottom plate and the weighting plate, the weighting plate having a lower surface formed with a plurality of the grooves generally similar to those provided in the bottom plate of the pan member.

In a still further aspect of the invention the weighting plate is provided at its lower surface with a plurality of substantially concentric ribs and alternating grooves between neighboring ribs, the weighting plate in this case being provided also with a plurality of vent holes spaced from each other and extending each from one of said grooves to the top surface of the weighting plate so that the air has access to said grooves through said vent holes and that all vapors can escape through these vent holes.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIGURE 1 is a lateral view, partly in section, of one embodiment of the invention;

FIGURE 2 is a plan view of the device according to FIGURE 1, the lid being removed;

FIGURE 3 is an enlarged fragmentary sectional elevation showing a portion of an element of a device, the section being taken along the lines III—III of FIGURE 2;

FIGURE 4 is a partly sectional side view of a component of the device according to the invention, the section being taken along the line IV—IV of FIGURE 5; and FIGURE 5 is a bottom view of the component illustrated by FIGURE 4.

Referring now to FIGURES 1 and 2, the utensil according to one embodiment of this invention includes a pan member 10 having curved side walls 12 and a bottom plate or food supporting member 11. A handle 13 is attached to the side wall 12. A lid 24 having a depression 26 in its upper center and a handle 25 bridging recess 26 is removably connected with the pan member 10.

As is particularly shown by FIGURE 2, the bottom plate 11 has an upper surface which is formed with a plurality of projections or ribs alternating with grooves therebetween. In this preferred embodiment illustrated by FIGURES 2 and 3, the surface of the bottom plate 11 is divided into sectors, each sector being separated from a neighboring sector by a radial groove or channel 15. Within each sector there are provided a plurality of V-shaped alternating ribs and grooves which have legs diverging towards the edge of the bottom plate; each of these legs extending substantially parallel to one of the radial grooves 15. Consequently, the grooves and ribs within one sector are in plan view V-shaped. The consecutive sets of ribs within one sector are marked 14, 16 and 17, respectively, and the interposed grooves are marked 18, 19, 20, respectively. Each projection comprises two substantially radial portions which converge in a direction toward the central zone of the upper surface of the food supporting member 11. The projections 17 are spaced from and are nested within the respective projections 16. It can be seen that the grooves 18, 19, 20 and the channels 15 extend in outward direction to the edge of the bottom plate 11 and are therefore open at their outer ends to communicate with an annular channel bounded by the side wall 12 and surrounding the radially arranged groups of projections 14, 16, 17. FIG. 2 shows that the food supporting upper surface of the member 11 is formed with sixteen groups of projections 14, 16, 17.

It will be understood that when meat or the like G is placed on top of the grooved and ribbed surface of the bottom plate 11, as can be seen from FIGURES 1 and 2, the mass G is supported in certain substantially radial strip areas by the upper edge or surface of the above mentioned ribs, while the areas of the lower surface of the mass G inbetween are exposed to the air in the above mentioned grooves. It is quite evident, that herein the face that the grooves 15, 18, 19, 20, extend outwardly and are open at the outer ends greatly facilitates the free circulation of hot air from the outside to the exposed areas of the lower surface of the food. Since hot air is the preferred medium for cooking the food item rather than heat transmitted bodily by the supporting portions of the cooking utensil, a very efficient method of cooking or grilling the food G can be carried out by the device according to the invention. At the same time, burning of the lower surface of the food G is greatly prevented or reduced because of the reduced contact surfaces between the bottom plate and the food itself.

It is very frequently desirable to treat the food to be grilled in such a manner that a weighing plate is applied like a lid directly on top of the food. As indicated in FIGURE 1, the device according to the invention preferably includes such a weighting plate 21 having a handle 23 so that it can be placed conveniently on top of the food G. Without going into further details it can be understood that the bottom surface of the plate 21 can be provided with ribs 22 and grooves extending in radial direction substantially as indicated by FIGURE 2. It did not appear to be necessary to show a bottom view of the plate 21 since the illustration would look exactly like the illustration of the upper face of the bottom plate 11 as contained in FIGURE 2. The fragmentary section of FIGURE 3 would equally apply to the plate 21 if FIGURE 3 is considered as a section taken along the line A—B of FIGURE 1. In operation, the alternating grooves and ribs on the lower side of the weighting plate 21 have a similar effect as the effect typical for the arrangement of grooves and ribs in the bottom plate 11. The air can again freely circulate between the outside and those areas of the top surface of the food G which is exposed to the air within the grooves in the bottom surface of the weighting plate 21. Also all vapors that may tend to escape from the heated food G can easily escape through the same grooves on the lower side of the plate 21.

FIGURES 4 and 5 illustrate an alternative embodiment of the weighting plate. In this case the weighting plate 31 having also a handle 34 is provided with a plurality of substantially concentric ribs 32 separated by correspondingly concentric grooves 32a. Evidently the effect of permitting free circulation of air into the grooves and permitting escape of fumes towards the outside would not be fulfilled in this case. However, according to the invention, every one of the grooves 32a is connected with the outside air through a plurality of vent holes 33 which extend from the groove to the upper surface of the plate 31. In order to obtain a substantially even distribution of access of air and escape of vapors, the various vent holes are evenly distributed along each groove and off-set against each other from groove to groove as can readily be seen from FIGURE 5.

As can be seen from FIGURE 1, the lid 24 is preferably so formed that no interference can occur between the handles 23 or 34 and the recessed prtion 26 of the lid 24.

It will be understood that each of the elements described above, or two or more together, may also find a useful application in other types of cooking utensils differing from the types described above.

While the invention has been illustrated and described as embodied in a cooking utensil, particularly for grilling meat or the like, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a cooking utensil, particularly for the grilling of food, a food supporting member formed with a substantially plane upper surface having a central zone and comprising a plurality of substantially V-shaped coplanar food supporting projections forming a plurality of radially arranged groups and each group having at least two spaced projections including a first and a second projection and the second projection being nested in the first projection, each of said projections comprising two substantially radial portions converging in a direction toward the central zone of said surface, and the projections in each of said groups defining therebetween substantially V-shaped air-conducting and liquid-retaining grooves having open ends distant from said central zone, the number of said groups of projections being such that a liquid contained in each of said grooves when said surface is in a fully horizontal position is retained in the grooves defined by a plurality of groups of said projections after the surface has been tilted from a fully horizontal position; said first projection of each of said groups extending to said central zone and defining a radial channel with the first projection of each adjacent group, said radial channels having open ends communicating with said central zone.

2. In a cooking utensil, particularly for the grilling of food, a food supporting member formed with a substantially plane upper surface having a central zone and comprising a plurality of substantially V-shaped coplanar food supporting projections forming a plurality of radially arranged groups and each group having at least two spaced projections including a first and a second projection and the second projection being nested in the first projection, each of said projections comprising two substantially radial portions converging in a direction toward the central zone of said surface, and the projections in each of said groups defining therebetween substantially V-shaped air-conducting and liquid-retaining grooves having open ends distant from said central zone, the number of said groups of projections being such that a liquid contained in each of said grooves when said surface is in a fully horizontal position is retained in the grooves defined by a plurality of groups of said projections after the surface has been tilted from a fully horizontal position; said first projection of each of said groups extending to said central zone and defining a radial channel with the first projection of each adjacent group, said radial channels having open ends communicating with said central zone; said food supporting member being formed with an annular channel surrounding said projections and communicating with each of said grooves and with each of said first-mentioned channels.

3. In a cooking utensil, particularly for the grilling of food, a food supporting member formed with a substantially plane upper surface having a central zone and comprising a plurality of substantially V-shaped coplanar food supporting projections forming sixteen radially arranged groups and each group having at least two spaced projections including a first and a second projection and the second projection being nested in the first projection, each of said projections comprising two substantially radial portions converging in a direction toward the central zone of said surface, and the projections in each of said groups defining therebetween substantially V-shaped air-conducting and liquid-retaining grooves having open ends distant from said central zone, whereby a liquid contained in each of said grooves when said surface is in a fully horizontal position is retained in the grooves defined by a plurality of groups of said projections after the surface has been tilted from a fully horizontal position; said first projection of each of said groups extending to said central zone and defining a radial channel with the first projection of each adjacent group, said radial channels having open ends communicating with said central zone.

References Cited in the file of this patent

UNITED STATES PATENTS

| 243,714 | Libbey | July 5, 1881 |
| 255,380 | Dodson | Mar. 21, 1882 |
| 663,483 | Betts | Dec. 11, 1900 |
| 1,243,823 | Dunkle | Oct. 23, 1917 |
| 1,764,908 | Strauss | June 17, 1930 |
| 2,184,828 | Woodman | Dec. 26, 1939 |

FOREIGN PATENTS

| 830 | Great Britain | Mar. 20, 1866 |
| 372,025 | Great Britain | May 5, 1932 |
| 159,933 | Switzerland | Apr. 1, 1933 |